United States Patent Office 3,658,816
Patented Apr. 25, 1972

3,658,816
PRODUCTION OF DIPYRIDYLIUM QUATERNARY DIHALIDE DIHALOGEN COMPLEXES
Robert M. Thomas, Fred R. Gerns, and John L. Sands, West Lafayette, Ind., assignors to Great Lakes Chemical Corporation, West Lafayette, Ind.
No Drawing. Continuation-in-part of application Ser. No. 770,082, Oct. 23, 1968. This application Aug. 17, 1970, Ser. No. 64,603
Int. Cl. C07d 51/02
U.S. Cl. 260—250 R          16 Claims

ABSTRACT OF THE DISCLOSURE

Production of dipyridylium quaternary dihalide halogen dicomplexes (which may also be called dihalide dihalogen complexes) using elemental halogen and alkali metal halide in water as solvent. The products are bacteriocidal and herbicidal agents and useful as defoliants and desiccants, particularly as cotton defoliant-desiccants.

---

This invention relates to the production of novel quaternary dihalide halogen complexes, more particularly to dihalogen complexes of N,N'-dialkyl-dipyridylium dihalides and N,N' - ethylene - dipyridylium dihalides. These novel compounds have recently been prepared by us and found to be valuable as herbicides, especially for growing vegetation, which is substantially severely damaged or completely destroyed by herbicidal treatment therewith, and as defoliants and desiccants, particularly as superior harvest aid chemicals having special application in the preparation of cotton for harvest by defoliation and desiccation without concurrent suppression of the opening of mature bolls of cotton plants treated therewith. Consequently, a superior method for the production of such compounds is of considerable interest.

RELATED APPLICATION

This application is a continuation-in-part of our prior-filed copending application Ser. No. 770,082, filed Oct. 23, 1968, now abandoned.

OBJECTS OF THE INVENTION

It is an object of the invention to provide a novel method for the production of dipyridylium quaternary dihalide halogen dicomplexes. Other objects will be apparent to those skilled in the art to which this invention pertains.

BACKGROUND OF INVENTION

Certain halogenated quaternary ammonium complexes are known in the art. The tetrabutyl ammonium tribromide type complex is disclosed and studied in Journal American Chemical Society, volume 72, page 425 (1951). It was there recognized that polyhalide complexes of monoquaternary ammonium halides have long been known. In many cases such compounds have been prepared as solid derivatives of the parent compound. In such cases, the quaternary halide has usually been dissolved in an organic solvent, the selected elemental halogen, e.g., bromine, added thereto, and the complex recovered after precipitation or removal of solvent. In the case of the present diquaternary dihalide dihalogen complexes, we have found the end product (the complex) to be water-insoluble. However, attempts to prepare them in water solution using elemental halogen have been unsuccessful or unsatisfactory. The present process allows their ready and facile preparation in the most economical of all solvents, viz., water, and employs, in addition to the elemental halogen, also an alkali metal halide. It is especially effective in producing high yields of desired dicomplex having high halogen titers when the concentration of starting diquaternary dihalide is above a certain preferred minimum.

The compounds which can be prepared according to the method of this invention are N,N'-lower-alkylene-dipyridylium and N,N'-diloweralkyl-dipyridylium dihalide dihalogen complexes (or halogen dicomplexes), i.e., hexahalides or bistrihalides, which can be represented by the following generic structural formula:

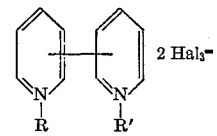

wherein R and R' are lower-alkyl of 1 to 8 carbon atoms and preferably 1 to 3 atoms, inclusive, when the dipyridylium group is 3,3'- or 4,4'-dipyridylium and collectively alkylene of 1 to 4 carbon atoms and preferably 2 or 3 carbon atoms, inclusive, when the dipyridylium group is 2,2'-dipyridylium; $Hal_3^-$ is a trihalide ion in which the halogen has an atomic weight from 35 to 80; inclusive, e.g., $Br_3^-$, $ClB_2^-$, preferably, $Br_3^-$. For example, the dipyridylium moiety can be 2,2'- 3,3'- 4,4'- or mixtures thereof. When the dipyridylium group is 3,3'- or 4,4'-, R and R' each can be $CH_3$, $C_2H_5$, n-$C_3H_7$, i-$C_3H_7$, t-butyl, or octyl. When the dipyridylium group is 2,2'-, R and R' collectively can be methylene, ethylene, trimethylene, propylene, etc. The halogen in $Hal_3^-$ can be chlorine, bromine or a combination of chlorine and bromine.

The following are representative compounds which are advantageously preparable according to this invention and within the scope of the above formula:

| | Y | $Hal_3^-$ |
|---|---|---|
| Compound: | | |
| 1 | $CH_2$ | $Br_3^-$ |
| 2 | $CH_2$ | $ClBr_2^-$ |
| 3 | $C_2H_4$ | $Br_3^-$ |
| 4 | $C_2H_4$ | $ClBr_2^-$ |
| 5 | $(CH_3)C_2H_3$ | $Br_3^-$ |
| 6 | $C_3H_6$ | $Br_3^-$ |
| 7 | $C_3H_6$ | $ClBr_2^-$ |

| | R | $R^1$ | $Hal_3^-$ |
|---|---|---|---|
| Compound: | | | |
| 8 | $CH_3$ | $CH_3$ | $Br_3^-$ |
| 9 | $CH_3$ | $CH_3$ | $ClBr_2^-$ |
| 10 | $C_2H_5$ | $C_2H_5$ | $Br_3^-$ |
| 11 | $C_2H_5$ | $C_2H_5$ | $ClBr_2^-$ |
| 12 | n-$C_3H_7$ | n-$C_3H_7$ | $Br_3^-$ |
| 13 | i-$C_3H_7$ | i-$C_3H_7$ | $Br_3^-$ |

The presence of non-interfering functional groups on the alkyl groups attached to the nitrogen atoms of the 3,3'- and 4,4'-dipyridylium molecules and/or an alkyl group on one or more of the dipyridylium ring carbon atoms will not affect the usefulness of the dipyridylium dihalide dihalogen complexes or their preparability by the present process. For example, the 2,2'-dipyridylium compounds can have a lower-alkyl, preferably methyl, group at one or more of the 4, 5, 6, 4', 5' and 6' positions and the 4,4'-dipyridylium compounds at one or more of the 2, 3, 5, 6, 2', 3', 5' and 6' positions, and one or both but preferably only one of R and R' is lower-alkyl in which the terminal carbon atom is substituted, e.g., with halogen, carboxyl, carbo-lower-alkoxy, phenyl, substituted phenyl, e.g., halophenyl, bromophenyl, nitrophenyl, tolyl, xylyl, etc.

Such compounds are solids, usually crystalline and colored when they are formed from elemental halogen. They are substantially insoluble in water and most organic solvents. The elemental halogen which forms the trihalide anion is titratable and, when the compounds are formed from two molar equivalents of halogen according to the present invention, the halogen titer is usually 80–98 percent of theory.

In carrying out the method of the invention, the reactants are admixed and intimately contacted in any convenient manner in the presence of water as a solvent. The diquaternary dihalide, elemental halogen, and alkali metal halide may all be admixed with water simultaneously, or one or more of the reactants in water solution may be admixed with one or more other of the reactants also in water solution. Conveniently, a water solution of the starting quaternary dihalide is added slowly, and with stirring, to a water solution of the elemental halogen and alkali metal halide. A precipitate of the desired complex, i.e., the diquaternary dihalide dihalogen complex (or, halogen dicomplex), which is ordinarily colored depending upon the elemental halogen involved, usually commences to form immediately and is readily recovered. Usually it is isolated by filtration, although other recovery procedure, e.g., solvent removal, may also be employed.

The elemental halogen employed may be chlorine or bromine. The alkali metal halide may be any alkali metal, e.g., sodium, potassium, or lithium, salt with a halogen selected from chlorine or bromine. If a complex in which all the halogen is the same is desired, the halogen of the elemental halogen and the alkali metal halide should be the same. If the halogen of the complex is to be different, the halogen of the elemental halide and the alkali metal halide may also differ, depending upon the halogens desired in the complex. When the halide of the starting quaternary dihalide is to remain and be present in the final product, use of an alkali metal halide containing the same halogen is advantageous, e.g., Cl to remain using NaCl or Br to remain using NaBr. When the halogen of the starting quaternary dihalide is to be replaced during the reaction, the alkali metal halide is advantageously selected to provide the halogen with which it is to be replaced, e.g., Cl with Br using NaBr.

The molar ratio of reactants is selected in any event so as to permit production of the desired diquaternary dihalide halogen dicomplex, which requires at least two moles of elemental halogen per mole of starting diquaternary dihalide. Ordinarily, this is provided by using about two moles of elemental halogen and two moles of alkali metal halide. Usually both are employed in slight excess. When the halogen of the starting diquaternary dihalide is to be replaced during the reaction, this ratio of reactants replaces the existing halogen atoms of starting quaternary dihalide by trihalide ions and the resulting hexahalide (complex) precipitates from solution. Use of only one mole of alkali metal halide in such case eliminates only a part of the halogen to be replaced in the starting diquaternary dihalide and results in production of a quaternary dihalide halogen dicomplex wherein not all halogens are alike. The molar ratios, then, are generally, but not necessarily, about one mole of starting quaternary dihalide to two moles of elemental halogen, e.g., bromine, to two moles of alkali metal halide, e.g., bromide, except when the diquaternary dihalide halogens are not to be replaced completely, in which case less alkali metal halide is employed to give the mixed dihalide complex.

The present method has proved itself capable of producing high yields of complex having a high degree of purity, as shown by halogen titer at various ranges of concentration of reactants in the water solvent. However, strikingly superior yields and improved halogen titers appear to be produced when the concentration of starting quaternary dihalide per liter of water is at least about 0.08 and, for some starting quaternary dihalides at least about 0.3. Under such conditions of concentration, by far the best yields of highest purity complex have been uniformly produced, as will be further illustrated in the following examples.

The reaction is preferably conducted at between about $-10°$ and $25°$ C., the lower temperature limit being determined by the solubility of the reactants in the solvent system and the upper temperature limit being determined by the rate of decomposition of the product and/or side reactions which may develop at higher temperatures.

If a mixed elemental halogen complex is desired, the halogens can be added concurrently or successively in amounts calculated to produce the desired molar ratio, or halogen in the starting diquaternary dihalide can be allowed to remain therein by use of less than two moles of alkali metal halide, or use of a metal halide containing the same halogen as in the starting dihalide, but different from the halogen of the elemental halogen employed.

If the starting quaternary dihalide is a dichloride, simultaneously with the formation of the halogen, e.g., bromine complex it can be reacted with two molar equivalents of alkali metal bromide, e.g., NaBr or KBr, to form the quaternary hexabromide. Reaction with one molar equivalent of the alkali metal salt produces a mixed quaternary dihalide complex.

The starting quaternary dihalides are prepared by reacting 2,2'- 3,3'- or 4,4'-dipyridyl with an amount of the selected alkylating agent sufficient to quaternize both nitrogen atoms. Thus, at least two molar equivalents of the selected alkyl chloride or bromide and at least one molar equivalent of the selected alkylene dichloride or dibromide is employed. Ordinarily, a large excess over these amounts is employed. Conventional quaternizing conditions are used. See U.S. 2,823,987, 3,202,500 and 3,332,959, Homer et al., J. Chem. Soc. (1960) 2498. Two of the dipyridylium dihalides used as starting materials to produce the novel halogen complexes of this invention, viz, N,N' - ethylene - 2,2' - dipyridylium dibromide and N,N' - dimethyl - 4,4' - dipyridylium dichloride, are used commercially as herbicides.

The following examples illustrate the method of this invention but are not to be construed as limiting.

PREPARATION N,N'-TRIMETHYLENE 2,2'-DIPYRIDYLIUM DIBROMIDE

A mixture of 2,2'-dipyridyl (0.077 mole) and 1,3-propylene dibromide (0.39 mole) was stirred under reflux for 15 hours. Acetone was added and the product which precipitated was collected by filtration, recrystallized and decolorized with Darco activated charcoal in boiling methanol. The product was isolated in 94 percent yield in two crops melting at 322° and 317°, respectively.

Examples 1–3

The complexes shown in Table I were prepared by the addition of a solution of the corresponding dipyridylium quaternary dibromide in water to a solution of two molar equivalents of bromine in aqueous NaBr at room temperature.

For a typical example, N,N'-ethylene-2,2'-dipyridylium dibromide dibromine dicomplex was prepared by adding with stirring a solution of 760 g. (0.78 M) of N,N'-ethylene-2,2'-dipyridylium dibromide to 249 g. of bromine in 1500 ml. of $H_2O$ containing 200 g. NaBr. The complex which precipitated immediately was collected, washed with water and air dried, yielding 962 g.[1] (92.5 percent) of the dibromine dicomplex. Halogen titration with KI-thiosulfate in the usual way showed 94.5 percent of theory of titratable halogen.

---
[1] Combined yield of two replicate reactions.

TABLE I

| | Structure | Yield, percent | M.P., °C. | Percent Br₂ by wt. | Br₂ titer, percent theory |
|---|---|---|---|---|---|
| 1 | 6,7-dihydrodipyrido [1,2-a: 2', 1'-c] pyrazidiinium bistribromide (commonly, N,N'-ethylene-2,2'-dipyridylium bistribromide) 2 Br₃⁻ | 92.5 | 170–185 | 48 | 94.5 |
| 2 | 7,8-dihydro-6H-dipyrido [1,2-a: 2', 1'-c] [1,4] diazepidiinium bistribromide  2 Br₃⁻ | 80 | 161–163 | 47 | 98 |
| 3 | CH₃—N⁺⟨ ⟩—⟨ ⟩—⁺N—CH₃  2 Br₃⁻ 1,1'-dimethyl-4,4'-dipyridylium bistribromide (commonly, N,N'-dimethyl-4,4'-dipyridylium bistribromide) | 88 | 255(d) | 48 | 95 |

Example 4.—N,N'-dimethyl-4,4'-dipyridylium bischlorodibromide

A solution of 64.3 g. (0.25 mole) N,N'-dimethyl-4,4'-dipyridylium dichloride in 160 g. of water was added with stirring to a solution of 88 g. (0.55 mole) of bromine and 32.2 g. (0.55 mole) of sodium chloride in 250 ml. of water.

The yellow-orange bromochloro complex precipitated from the solution. Upon washing with water and drying, the complex titrated 82% of theory halogen.

PREPARATION N,N'-DI-n-PROPYL-4,4'-DIPYRIDYLIUM DIBROMIDE

N,N'-dipropyl-4,4'-dipyridylium dibromide was prepared by stirring a mixture of 15.6 g. (0.1 mole) of 4,4'-dipyridyl and 50 g. (0.407 mole) of n-propyl bromide in 100 ml. of n-propanol for 24 hours under reflux. The reaction mixture was stripped to dryness under vacuum and the residue slurried with acetone. The product was filtered and washed with acetone.

Example 5.—N,N'-di-n-propyl-4,4'-dipyridylium bistribromide

A solution of 40.2 g. (0.1 mole) of N,N'-di-n-propyl-4,4'-dipyridylium dibromide in 100 ml. of water was stirred into a solution of 35 g. (0.22 mole) of bromine and 22.5 g. (0.22 mole) of sodium bromide in 60 ml. of water. The orange-colored bromine complex precipitated immediately. It was collected by suction filtration and washed with water.

Titration of bromine by the standard thiosulfate method showed an active bromine titer of 95% of theory.

Example 6.—N,N'-ethylene-2,2'-dipyridylium bischlorodibromide

Bromine, 88 g. (0.55 mole), was introduced into a solution of 32.2 g. (0.55 mole) of sodium chloride in 250 ml. of water. A solution of 64.3 g. (0.25 mole) of N,N'-ethylene-2,2'-dipyridylium dichloride in 158 g. of water was then added with stirring. The yellow product precipitated.

Upon washing with water and drying, the product titrated 85% of theory halogen.

Example 7.—N,N'-dimethyl-4,4'-dipyridylium bistribromide (GLC 514)

N,N'-dimethyl-4,4'-dipyridylium dichloride, 221 g. (0.25 mole) in the form of a 29.1% solution was added over 30 minutes to a solution of 88.0 g. (0.55 mole) of bromine and 56.7 g. (0.55 mole) of sodium bromide in 150 ml. water. The solid which precipitated immediately was collected, washed with water, and dried, yielding 159.5 g. (96% of theory) of product containing 46.8% (97.4% of theory) of active bromine.

Example 8.—N,N'-ethylene-2,2'-dipyridylium bistribromide (GLC 506)

N,N'-ethylene-2,2'-dipyridylium dibromide, 244 g. (0.25 mole) in the form of a 35.3% aqueous solution was added over 30 minutes to a solution of 88.0 g. (0.55 mole) of bromine and 56.7 g. (0.55 mole) of sodium bromide in 150 ml. water. The solid which precipitated immediately was collected, washed with water, and dried, yielding 166.3 g. (100% of theory) of product containing 45.8% (95.1% of theory) of active bromine.

Example 9

In a series of duplicate reactions in the manner of Examples 7 and 8, the following results were obtained:

GLC 514 (EXAMPLE 7)

| | Percent yield | |
|---|---|---|
| Starting quat. dihalide moles/1,000 g. H₂O | Based on weight | Based on titer and weight |
| 0.28 | 75 | 72.5 |
| 0.55 | 91.4 | 88.3 |
| 0.82 | 96 | 93.5 |

From the foregoing, the efficiency of the process of the invention is apparent, especially at starting quaternary dihalide concentrations in excess of 0.3 mole per liter of water solvent.

GLC 506 (EXAMPLE 8)

| | Percent yield | |
|---|---|---|
| Starting quat. dihalide moles/1,000 g. H₂O | Based on weight | Based on titer and weight |
| 0.087 | 98 | 94.5 |
| 0.20 | 98 | 94.5 |
| 0.39 | 92.5 | 87.4 |
| 0.82 | 100 | 95.1 |

From the foregoing, the efficiency of the process of the invention is apparent, especially at concentrations above 0.08 moles per liter of water solvent.

The present invention is not to be considered limited to the exact materials, compounds, compositions, proportions, methods, or procedures shown and described, as obvious modifications and equivalents will be apparent to one skilled in the art, and the invention is therefore to be limited only by the full scope of the appended claims.

We claim:

1. Process for producing a diquaternary dihalide dihalogen complex selected from the group consisting of N,N'-lower alkylene-dipyridylium dihalide and N,N'-di-lower alkyl-dipyridylium dihalide dihalogen complexes from a corresponding water soluble diquaternary dihalide wherein all halogen has an atomic weight of 35 to 80 inclusive, which comprises the steps of admixing in water as solvent a starting diquaternary dihalide, elemental bromine, and alkali metal halide wherein the halogen is selected from the group consisting of chlorine and bromine and, at a temperature below that at which undesirable decomposition occurs, allowing the diquaternary dihalide dihalogen complex product to precipitate from solution, and recovering the same.

2. Process according to claim 1 wherein the temperature is up to about 25° C.

3. Process according to claim 1 wherein the molar ratio of alkali metal halide and elemental halogen is about one to one.

4. Process according to claim 1 wherein the halogen is bromine.

5. Process according to claim 1 wherein the halogen of the elemental halogen and of the alkali metal halide is the same.

6. Process according to claim 1 wherein the halogen of the elemental halogen and of the alkali metal halide is different, and the product contains both halogens.

7. Process according to claim 1 wherein the elemental halogen is bromine and the alkali metal halide is sodium bromide.

8. Process according to claim 1 wherein the starting diquaternary dihalide is N,N'-ethylene-2,2'-dipyridylium dihalide.

9. Process according to claim 1 wherein the starting diquaternary dihalide is N,N'-ethylene-2,2'-dipyridylium dibromide.

10. Process according to claim 1 wherein the starting diquaternary dihalide is N,N'-dimethyl-4,4'-dipyridylium dihalide.

11. Process according to claim 1 wherein the starting diquaternary dihalide is N,N'-dimethyl-4,4'-dipyridylium dichloride.

12. Process of claim 8 wherein the elemental halogen is bromine and the alkali metal halide is an alkali metal bromide.

13. Process of claim 10 wherein the elemental halogen is bromine and the alkali metal halide is an alkali metal bromide.

14. Process of claim 1 wherein the molar ratio of reactants is about one mole of starting quaternary dihalide to about two moles of alkali metal halide and about two moles of elemental halogen and wherein the concentration of starting diquaternary dihalide in moles per liter of water is at least about 0.08.

15. Process of claim 8 wherein the molar ratio of reactants is about one mole of starting quaternary dihalide to about two moles of alkali metal halide and about two moles of elemental halogen and wherein the concentration of starting diquaternary dihalide in moles per liter of water is at least about 0.08.

16. Process of claim 10 wherein the molar ratio of reactants is about one mole of starting quaternary dihalide to about two moles of alkali metal halide and about two moles of elemental halogen and wherein the concentration of starting diquaternary dihalide in moles per liter of water is at least about 0.3.

References Cited
UNITED STATES PATENTS

| | | | |
|---|---|---|---|
| 3,202,500 | 8/1965 | Homer | 71—92 |
| 3,308,124 | 3/1967 | Braunholtz et al. | 260—250 |
| 3,311,535 | 3/1967 | Whipp | 424—250 |

ALAN L. ROTMAN, Primary Examiner

U.S. Cl. X.R.

260—296 D

UNITED STATES PATENT OFFICE
CERTIFICATE OF CORRECTION

Patent No. 3,658,816            Dated April 25, 1972

Inventor(s) Robert M. Thomas, Fred R. Gerns, and John L. Sands

It is certified that error appears in the above-identified patent and that said Letters Patent are hereby corrected as shown below:

Column 1, line 42: Delete "now abandoned" and insert -- now U. S. Patent 3,641,041 issued February 8, 1972 --.

Signed and sealed this 5th day of December 1972.

(SEAL)
Attest:

EDWARD M. FLETCHER, JR.
Attesting Officer

ROBERT GOTTSCHALK
Commissioner of Patents